N. H. SHAW.
INNER TUBE FOR PNEUMATIC TIRES.
APPLICATION FILED MAY 28, 1917.

1,257,409.

Patented Feb. 26, 1918.

*Inventor,*
Nathaniel H. Shaw
by Heard Smith & Tennant.
Attys.

UNITED STATES PATENT OFFICE.

NATHANIEL H. SHAW, OF BOSTON, MASSACHUSETTS.

INNER TUBE FOR PNEUMATIC TIRES.

1,257,409.  Specification of Letters Patent.  Patented Feb. 26, 1918.

Application filed May 28, 1917. Serial No. 171,427.

*To all whom it may concern:*

Be it known that I, NATHANIEL H. SHAW, a citizen of the United States, residing at Boston, county of Suffolk, State of Massachusetts, have invented an Improvement in Inner Tubes for Pneumatic Tires, of which the following description, in connection with the accompanying drawing, is a specification, like characters on the drawing representing like parts.

This invention relates to inner tubes for pneumatic tires and has for its object to provide an improved inner tube which will be self-sealing in case it becomes punctured. I propose to accomplish this by making the inner tube in two sections which have a concentric relation to each other so that one of the tube sections is situated within the other and by so constructing said tube sections that when the inner tube is inflated and thereby subjected to internal pressure, a zone will be formed in the body of the inner tube in which the material thereof is subjected to compression in a direction at right angles to a radial line. As a result, whenever the inner tube is punctured and the puncturing implement is withdrawn, the internal stresses at this zone in the inner tube will close the puncture and prevent the escape of the air. This zone in which the material of the inner tube is subjected to compression in a direction at right angles to a radial line may be created in various ways, but preferably by providing the outer face of the inner tube section with V-shaped grooves and wedge-shaped ribs which preferably have flattened or rounded apices and by providing the inner face of the outer tube section with correspondingly-shaped ribs and grooves, the ribs of each section being received in the grooves of the other section. Owing to the fact that the ribs have flattened apices and to the further fact that the ribs and grooves are wedge-shaped in cross-section, the air pressure in the inflated tire will force the ribs into the grooves with a wedging action, thus producing the desired zone of transverse compression.

In order to give an understanding of my invention, I have illustrated in the drawings some selected embodiments thereof which will now be described, after which the novel features will be pointed out in the appended claim.

Figures 2, 3:
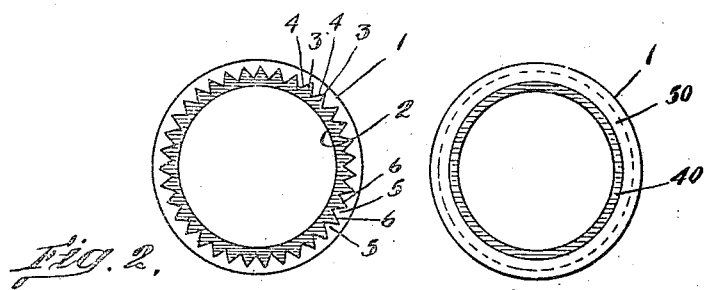
Fig. 2 is a sectional view through an inner tube embodying my invention.
Fig. 3 is a similar view through an inner tube showing a different embodiment of my invention.

As stated above, my improved inner tube comprises two tube sections, one of which is situated within the other and which for convenience will hereinafter be referred to as the inner tube section and the outer tube section. In Fig. 2, for instance, which is a transverse section of an inner tube embodying my invention, the outer tube section is indicated at 1 and the inner tube section at 3, the inner tube section being placed within the outer tube section. Each tube section is formed on the face thereof which has engagement with the other tube section with ribs and grooves that fit corresponding grooves and ribs in the face of the other section. For instance, in the construction shown in Fig. 2, the inner tube section 2 is provided on its outer face with a plurality of ribs 3 and with grooves 4 formed between the ribs, and the outer tube section 1 is provided on its inner face with a plurality of ribs 5 and grooves 6 formed between the ribs 5. The ribs 5 on the outer tube section 1 are constructed to fit the grooves 4 formed on the inner tube section 2, and similarly the ribs 3 on the inner tube section are constructed to fit the grooves 6 formed in the outer tube section 1. These ribs and grooves may extend either longitudinally of the tire or circumferentially thereof and they may have any suitable shape. I will preferably, however, make the grooves V-shaped, and make the ribs of a corresponding shape. In Fig. 2 the ribs and grooves extend longitudinally of the tire, and in Fig. 5, a part of an inner tube is shown in which a portion of the outer tube section is turned back, as shown at 7, to better illustrate the construction of the ribs and grooves.

Figure 6:
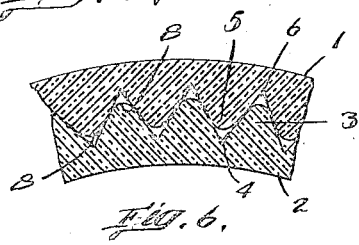
Fig. 6 is an enlarged sectional view showing the construction illustrated in Fig. 2.

The ribs 3 and 5 are formed with rounded or flattened apices, as shown in Fig. 6. As a result there will exist a space between the apex of each rib and the bottom of the groove which it occupies. When the tube is placed in the tire casing and is inflated to the proper pressure, the internal pressure against the inner wall of the inner tube section 2 will force the ribs 3 thereon outwardly into the grooves 6 of the outer tube section, and the ribs 5 of the outer tube section will likewise be forced into the grooves 4 formed on the inner tube section. Since the grooves have tapering walls, this operation will tend to compress each rib in the groove in which it was received, thus creating within that portion of the body of the inner tube occupied by the ribs and grooves a pressure in a direction at right angles to a radial line, the degree of pressure depending somewhat on the shape of the ribs and grooves and on the internal air pressure within the inner tube. Owing to the fact that the ribs are flattened or rounded, there will exist a space between the apex of each rib and the bottom of the groove it occupies, and hence there will be a continuing wedging action which develops compression in a direction at right angles to a radial line because the entire pressure of the air will be transmitted through the wedging sides of the ribs and grooves. If an inner tube having this construction should become accidentally punctured, this pressure which is thus created in a direction transverse or at right angles to a radial line will operate to close the puncture and thus prevent the escape of air.

Figures 4, 5:
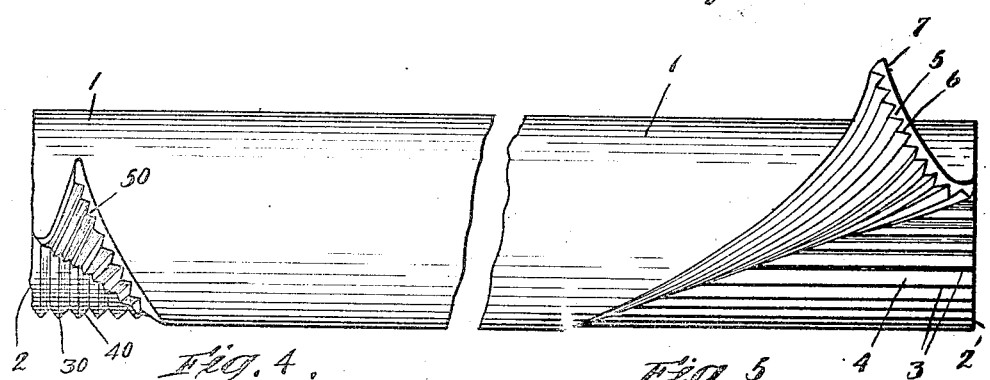
Fig. 4 is a side view of an inner tube having the construction shown in Fig. 3.
Fig. 5 is a similar view of an inner tube having the construction shown in Fig. 2.

In Figs. 3 and 4 I have shown an embodiment of the invention wherein the grooves and ribs run circumferentially of the tire. In this embodiment, the ribs on the outer tube section 1 are designated 50; the grooves in the inner tube section which receive the ribs 50 are designated 40; the ribs on the inner tube section are designated 30, and the grooves in the outer tube section which receive the ribs 30 are designated 60.

The same result will occur from the arrangement of grooves shown in Figs. 3 and 4 as that shown in Figs. 2 and 5. The inner tube embodying my invention may be made in various ways. The advantage of forming the ribs 3 and 5 with the rounded points 8 is that this construction prevents a space between the point of each rib and the bottom of the corresponding groove so that when the inner tube is subjected to internal pressure, the ribs will wedge into the grooves more effectively than if the point of each rib had engagement with the bottom of the corresponding groove.

Figure 1:
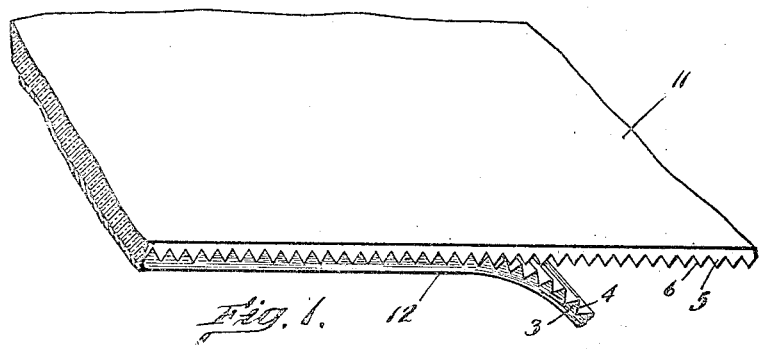
Figure 1 is a view showing one way in which my improved inner tube may be made.

In Fig. 1 I have shown two sheets or strips 11 and 12, each having ribs and grooves formed on one face thereof. These sheets or strips will be made of rubber, and to make the inner tube, they may be placed so that the ribs of one sheet will fit the grooves of the other sheet and then the two sheets thus combined may be rolled up into tubular shape and the edges secured together in any usual way. In this way a tube of the proper length can be made, after which the ends of the tubes may be brought together and cemented and vulcanized to each other.

The tube sections shown in Figs. 2 and 5 may be made in the same way that ordinary inner tubes are made by simply using dies having fluted faces to provide the necessary fluted faces on the tube sections.

I claim:

A pneumatic tire comprising two tube sections, one seated within the other, each section having grooves formed in the face thereof which engages the other section and also having ribs thereon to enter the grooves of the other section, the bottom of the grooves being substantially V-shaped and the apex of the ribs rounded, whereby a space will exist between the apex of each rib and the bottom of the groove it occupies, thus effecting a wedging action between the ribs of the opposing tube sections.

In testimony whereof, I have signed my name to this specification.

NATHANIEL H. SHAW.